United States Patent
White et al.

(10) Patent No.: US 9,438,571 B2
(45) Date of Patent: *Sep. 6, 2016

(54) SECURELY CONNECTING CONTROL DEVICE TO TARGET DEVICE

(71) Applicant: NETFLIX, INC., Los Gatos, CA (US)

(72) Inventors: Jean-Marie White, San Jose, CA (US); Baskar Odayarkoil, Los Gatos, CA (US); Lee Adams, Los Gatos, CA (US)

(73) Assignee: Netflix, Inc., Los Gatos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/792,191

(22) Filed: Jul. 6, 2015

(65) Prior Publication Data

US 2015/0312231 A1    Oct. 29, 2015

Related U.S. Application Data

(63) Continuation of application No. 14/161,558, filed on Jan. 22, 2014, now Pat. No. 9,077,693.

(60) Provisional application No. 61/881,304, filed on Sep. 23, 2013.

(51) Int. Cl.
*H04L 29/06* (2006.01)
*H04L 9/08* (2006.01)
*H04W 12/04* (2009.01)
*H04W 12/06* (2009.01)
*H04L 9/32* (2006.01)

(52) U.S. Cl.
CPC .......... *H04L 63/061* (2013.01); *H04L 9/0822* (2013.01); *H04L 9/0827* (2013.01); *H04L 9/3297* (2013.01); *H04L 63/0428* (2013.01); *H04L 63/0471* (2013.01); *H04W 12/04* (2013.01); *H04W 12/06* (2013.01); *H04L 2463/062* (2013.01)

(58) Field of Classification Search
CPC . H04L 63/08; H04L 9/0816; H04L 63/0869; H04L 63/0428
See application file for complete search history.

(56) References Cited

U.S. PATENT DOCUMENTS

2005/0010680 A1 * 1/2005 Zick .................... H04L 63/0853
709/237

OTHER PUBLICATIONS

U.S. Appl. No. 14/161,558, filed Jan. 22, 2014, Notice of Allowance, Mar. 3, 2015.

* cited by examiner

*Primary Examiner* — Izunna Okeke
(74) *Attorney, Agent, or Firm* — Hickman Palermo Becker Bingham LLP

(57) ABSTRACT

In an approach, a target computing device receives a pairing request from a controller computing device, the pairing request including controller credentials that were previously received by the controller computing device from an authentication server computer and encrypted under a service key. The target computing device forwards the pairing request to the authentication server, the authentication server computer being configured to return a pairing response based at least in part on the controller credentials. The target computing device receives the pairing which includes a shared secret encrypted under a target device key and the same shared secret encrypted under a controller key. The target computing device decrypts the shared secret encrypted under the target device key and forwards the shared secret encrypted under the controller key to the controller device. Using the decrypted shared secret, the target computing device establishes a secure connection to the controller computing device.

21 Claims, 8 Drawing Sheets

SECURELY CONNECTING CONTROL DEVICE TO TARGET DEVICE

CROSS-REFERENCE TO RELATED APPLICATIONS; BENEFIT CLAIM

This application claims the benefit as a continuation of application Ser. No. 14/161,558, filed Jan. 22, 2014, which claims the benefit of to provisional application 61/881,304, filed Sep. 23, 2013, the entire contents of which are hereby incorporated by reference for all purposes as if fully set forth herein.

TECHNICAL FIELD

The present disclosure generally relates to aspects of computer security, including securely connecting control computing devices to a target computing device.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

A second screen device (also known as a "companion device") may be a portable screen-based computing device (for example a smartphone, tablet computer) that allows a content consumer to interact with content (for example shows, movies, music, video games) that is presented by a media device (for example game console, set-top box, digital video player, television). In many cases, the second screen device is synchronized with the content displayed on the media device and displays additional options or data that enhances the user's experience. In typical cases, the second screen device and the media device are located close to each other (for example close enough that the user can view both screens without too much effort) and communicatively coupled over the user's local area network (LAN). As one example, a smartphone can be configured to allow a user to view live tweets or comments related to a program being displayed on their television. As another example, a tablet computer can be synchronized with a game console to display additional data, such as a map or heads-up display. As yet another example, a second screen device can be synchronized with a digital video recorder to select and control media for presentation, essentially replacing the need for a standard remote control.

However, while second screen technology allows multiple devices to work in concert to enhance the user's experience, many uses of this technology also require communication between the pairing and external servers on which the user has an account (for example servers that provide the media content, game servers that allow players to interact online). Thus, to protect the user's communications and devices, security is needed not only between the pair of devices, but also between the devices and the authentication server that binds the pairing to the user's account. This issue can also be made difficult in light of the fact that second screen devices may be more vulnerable to attack than the multimedia devices, as well as the converse. As a result, security for the system may run into *Byzantine* device failures (untrustworthy devices), as well as other standard attacks such as man-in-the-middle and replay.

DETAILED DESCRIPTION

Figure 1:
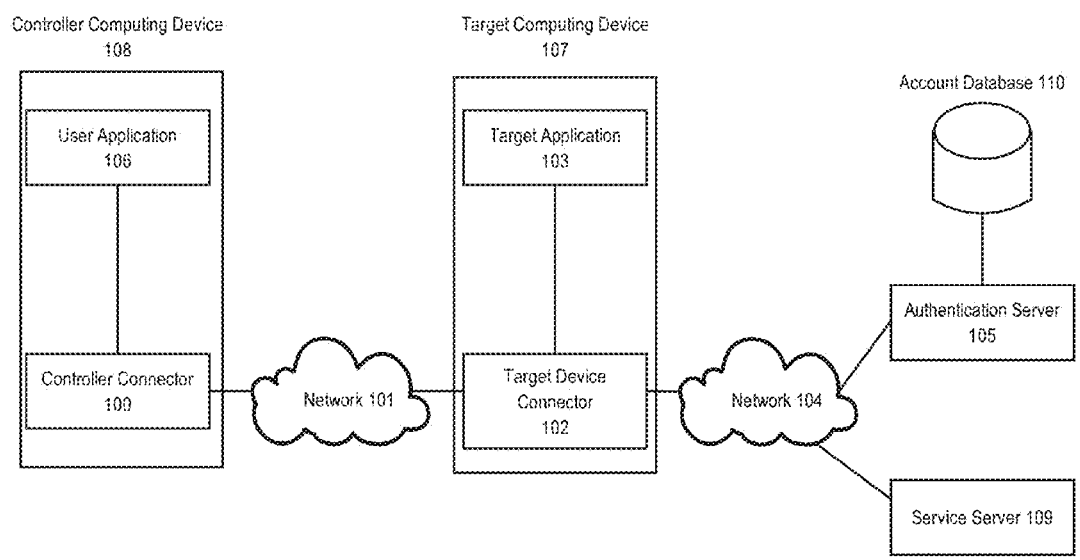
FIG. 1 illustrates an example operating environment upon which an embodiment may be implemented.

In the following description, for the purposes of explanation, numerous specific details are set forth to provide a thorough understanding of the present invention. It will be apparent, however, that the present invention may be practiced without these specific details. In other instances, well-known structures and devices are shown in block diagram form to avoid unnecessarily obscuring the present invention.

Reference will be made to various communications such as "messages", "packets", "frames", "segments", etc. belonging to different layers of the Open System Interconnection (OSI) model. However, mention of a particular type of communication in conjunction with a feature is not intended to limit the feature to only one layer of the OSI model. Thus, a feature discussed as applicable to one layer of the OSI model may also be applicable to other layers of the OSI model as well.

Embodiments are described herein according to the following outline:

1.0 General Overview
  2.0 Example Operating Environment
  3.0 Pairing Operation
  4.0 Secure Communication Sessions
  5.0 Example Second Screen Control User Interfaces
  6.0 Implementation Mechanisms—Hardware Overview
  7.0 Extensions and Alternatives

1.0 General Overview

In an embodiment, a target computing device receives a pairing request from a controller computing device, the pairing request including controller credentials that were previously received by the controller computing device from an authentication server computer and encrypted under a service key that is not available to the controller computing device or the target computing device. The target computing device forwards the pairing request to the authentication server computer, the authentication server computer being configured to return a pairing response based at least in part on the controller credentials. The target computing device receives the pairing response from the authentication server computer, the pairing response including a shared secret encrypted under a target device key and the same shared secret encrypted under a controller key, the controller key being unavailable to the target computing device and the target device key being unavailable to the controller computing device. The target computing device decrypts the shared secret encrypted under the target device key and forwards the shared secret encrypted under the controller key to the controller device. The target computing device then uses the decrypted shared secret to establish a secure connection to the controller computer device and receives one or more control messages over the secure connection that are configured to control one or more functions of the target computing device.

In an embodiment, the target computing device is configured to present multimedia content and the target computing device receives, over the secure connection, an instruction from a second screen user interface application executing on the controller computing device that causes the target computing device to modify presentation of the multimedia content.

In an embodiment, modifying the presentation of the multimedia content includes one or more of: changing volume of the target device, enabling or disabling closed captioning on the multimedia content, beginning playback of the multimedia content, pausing the multimedia content, switching presentation to different multimedia content, changing playback of the multimedia content to resume at a different point in time within the multimedia content, ending playback of the multimedia content, or displaying title recommendations.

In an embodiment, the controller computer device determines that a period of time has elapsed without receiving input from a user and in response enters a power saving mode and locks the controller computing device to prevent user access to one or more functions of the controller computing device. In response to exiting the power saving mode, the controller computing device displays a user interface that allows the user to unlock the controller computing device, the interface including one or more options which, when selected, cause the target computing device to modify presentation of the multimedia content.

In an embodiment, the controller computing device determines that the target computing device has finished playback of the multimedia content and in response displays one or more titles. The controller computing device, in response to receiving user input specifying selection of a particular title of the one or more titles, sends a message to the target computing device over the secure connection that causes the target computing device to begin presentation of the particular title.

In an embodiment, the target computing device sends at least a portion of the pairing request to a target application executing on the target computing device that is configured determine whether to accept or reject the pairing request based on one or more criteria. The target computing device forwards the pairing request to the authentication server in response to receiving a communication from the target application indicating that the target application has accepted the pairing request.

In an embodiment, the target computing device sends at least a portion of the pairing response to a target application executing on the target computing device that is configured determine whether to accept or reject the pairing response based on one or more criteria. The target application forwards the shared secret encrypted under the controller key to the controller computing device in response to receiving a communication from the target application indicating that the target application has accepted the pairing response.

In an embodiment, the controller computing device and the target computing device are communicatively coupled by a local area network. In some embodiments, the controller computing device and the target computing device reside on the same subnet.

In an embodiment, the controller computing device is any of a smartphone. a tablet computer, or a wearable computing device.

In an embodiment, the target computing device is a television.

In an embodiment, the pairing request includes a timestamp generated based on a clock of the controller computing device and the pairing response includes the same timestamp encrypted under the target device key. The target computing device decrypts the timestamp; performs a lookup into a log of previously received timestamps to determine whether the timestamp had been previously received; in response to determining that the timestamp had not been previously received, determines whether the timestamp is within a threshold distance of a current time indicated by a clock of the target computing device; in response to determining that the timestamp is within the threshold distance of the current time, the target computing device records the timestamp in the log and forwards the shared secret encrypted under the controller key to the controller computing device.

In an embodiment, the pairing response includes target device credentials for the target computing device that are encrypted under the service key.

In other embodiments, the invention encompasses a computer apparatus, a computer system, and a computer-readable medium configured to carry out the foregoing steps.

2.0 Example Operating Environment

FIG. 1 illustrates an example operating environment upon which an embodiment may be implemented. In FIG. 1, controller computing device 108 is communicatively coupled to target computing device 107 over network 101. Target computing device 107, in turn, is communicatively coupled to authentication server 105 and service server 109 over network 104. In addition, the authentication server 105 is communicatively coupled to account database 110. Controller computing device 108 executes user application 106 and controller connector 100. Target computing device 107 executes target application 103 and target device connector 102.

For the sake of providing clear examples, only a particular number of elements have been depicted in FIG. 1. However, other embodiments may have a different number of elements or may have the elements arranged in a different order. For example, a practical environment may be scaled to have thousands or millions of the components depicted in FIG. 1. As another example, an embodiment may include a server computer, virtual machine instance or multiple computing elements that combine the functions of both the authentication server 105 and the service server 109. As yet another example the authentication server 105 and the service server 109 may reside on the same LAN.

In an embodiment, controller computing device 108 is second screen device (for example tablet computer, smart phone, screen-enabled game controller, or wearable computing device such as a computer enhanced watch or eyeglass device) that is used to control or otherwise modify the operation of the target computing device 107. The controller computing device 108 executes user application 106 which is configured to send instructions to target application 103

(or other component of target computing device 107) to facilitate the aforementioned control. In some embodiments, the user application 106 displays a second screen user interface that provides the user with options to control the target computing device 107. For example, the user application 106 may be a mobile application that provides a graphical user interface (GUI) on the controller computing device 108 that can be used to select multimedia titles for viewing on target computing device 107. In an embodiment, the user application may be the NETFLIX app commercially available from Netflix, Inc., Los Gatos, Calif. via the APPLE APP STORE, ANDROID PLAY STORE and other outlets.

In an embodiment, the user application 106 communicates with the target application 103 through the controller connector 100, which acts as a software and/or hardware communication endpoint that secures the connection between the controller computing device 108 and the target computing device 107. For example, the controller connector 100 may provide an application programming interface (API) that can be used by the user application 106 (or other component of controller computing device 108) to securely exchange communications with the target application 103 (or other component of target computing device 107). In an embodiment, the controller connector 100 establishes a secure communications channel with the target device connector 102, which is then used to send and receive the aforementioned communications.

In an embodiment, target computing device 107 is a media device (for example television, set top box, digital video recorder, disc player, projector, music player, or game console) that is configured to receive and process commands from the controller computing device 108. The target computing device 107 executes target application 103 which is configured to receive instructions from user application 106 to facilitate the aforementioned processing. For example, target application 103 may represent a software platform that allows users to select content for viewing (for example select content stored locally for playback, stream content from a remote site) and/or control playback of the content (stop, pause, play, rewind, fast forward, volume control, closed caption options, jump to point-in-time). The target application 103 may be the NETFLIX application, which is commercially available from Netflix, Inc., Los Gatos, Calif.

In an embodiment, the target application 103 communicates with the user application 106 through the target device connector 102, which acts as a software and/or hardware communication endpoint that secures communications between the target computing device 107 and the controller computing device 108. For example, the target device connector 102 may provide an API that can be used by the target application 103 (or other component of target computing device 107) to securely exchange communications with user application 106 (or other component of controller computing device 108). In an embodiment, the target device connector 102 establishes a secure communications channel with the controller connector 100, which is then used to send and receive the aforementioned communications.

In some embodiments, the instructions from the controller computing device 108 may be routed by the target device connector 102 to different components of the target computing device 107 depending on the type of instruction that has been received. For example, the target computing device 107 may possess one or more additional hardware or software components (not depicted in FIG. 1) installed by the manufacturer to control hardware functions (for example volume controls) which may be the recipient of certain instructions from the user application 106, rather than the target application 103. As another example, multiple target applications may be executed by the target computing device 107 concurrently and communications from the user application 106 may be routed to the correct recipient by target device connector 102. Similarly, the controller connector 100 may route messages from the target computing device 107 to components of the controller computing device 108 other than the user application 106.

In an embodiment, network 101 and network 104 represent any combination of one or more local networks, wide area networks, or internetworks. Data exchanged over the networks, may be transferred using any number of network layer protocols, such as Internet Protocol (IP), Multiprotocol Label Switching (MPLS), Asynchronous Transfer Mode (ATM), and Frame Relay Furthermore, in embodiments where the networks represent a combination of multiple sub-networks, different network layer protocols may be used at each of the underlying sub-networks. In an embodiment, network 101 represents a LAN that is used to convey communications between the controller computing device 108 and the target computing device 107. In addition, network 104 represents an external network used to convey communications between the target computing device 107 and the servers (authentication server 105 and service server 109). For example, network 101 may represent a home Wi-Fi network and network 104 may represent the public Internet.

In an embodiment, the authentication server 105 represents one or more software and/or hardware components that registers the controller computing device 108 and target computing device 107, as well as determines whether the devices are allowed to pair. For example, upon being authenticated, the authentication server 105 may issue a ticket or other form of credential that can be provided to the service server 109 as proof of identity and authorization to access the service. In addition, assuming the pairing is approved, the authentication server 105 provides a shared secret to the controller computing device 108 and the target computing device 107, which is used to secure (for example encrypt) messages sent through the controller connector 100 and the target device connector 102.

In an embodiment, the service server 109 represents one or more software and/or hardware components that provide a given service. For example, the service server 109 may provide a service that delivers streaming media to users. As another example, the service server 109 may run a back-end server for hosting online multiplayer game sessions for users.

In an embodiment, the authentication server 105 is coupled to or has access to an account database 110, which stores account information for users of the service provided by the service server 109. For example, the account database 110 may store encrypted user names, passwords, or other credentials for the customers of the service, as well as other information related to the user's account, for example permissions, authentication information for devices previously linked to the account, and account activity history. In some embodiments, the account database 110 may also store service related information for users. For example, the service provided by the service server 109 may stream media content to users, and the service related information could relate to pre-computed title recommendations, viewing histories, usage rates.

3.0 Pairing Operation

Figure 2:
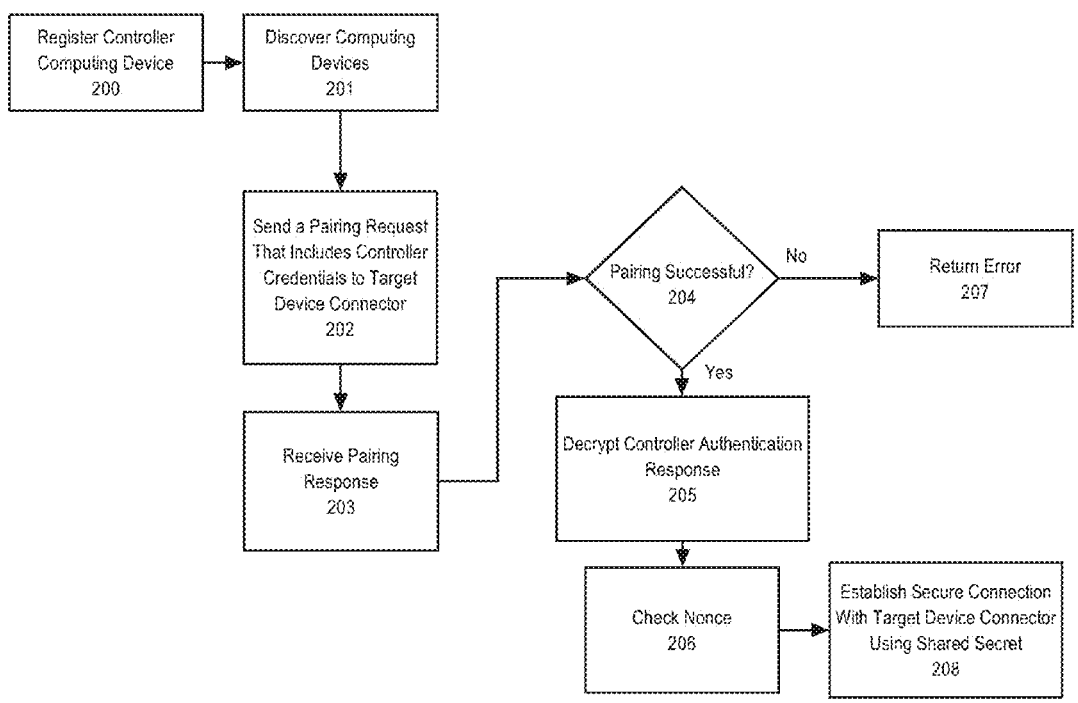
FIG. 2 illustrates a process flow for a controller connector in block diagram form according to an embodiment.
Figure 3:
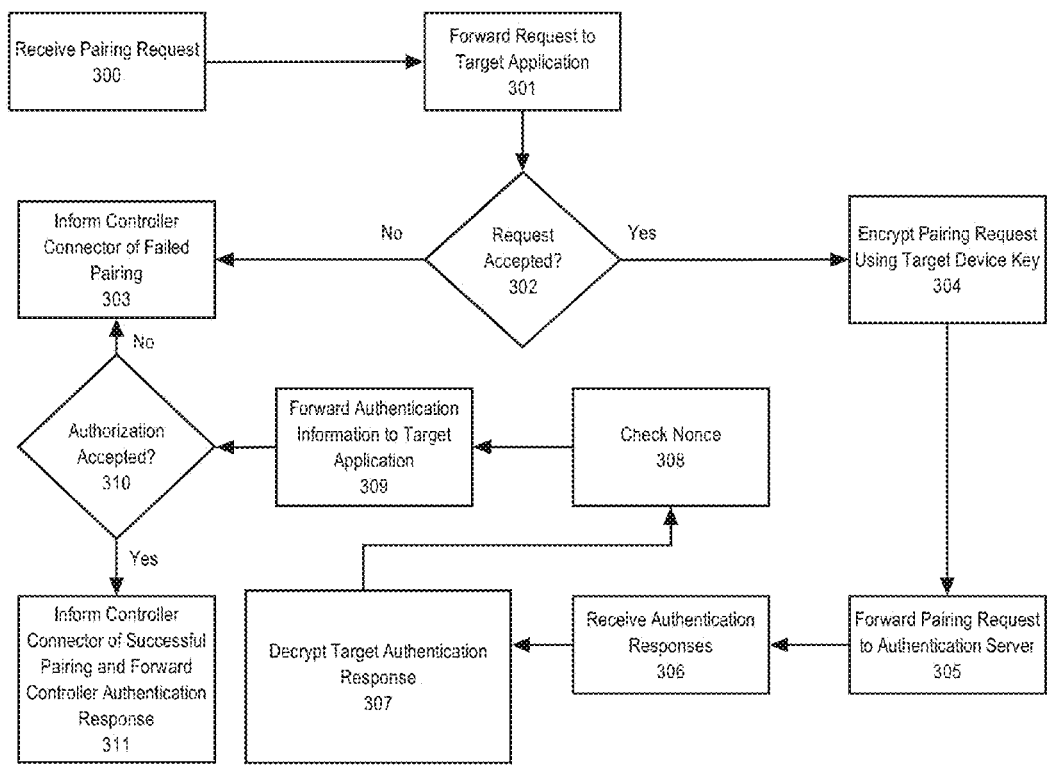
FIG. 3 illustrates a process flow for a target device connector in block diagram form according to an embodiment.
Figure 4:
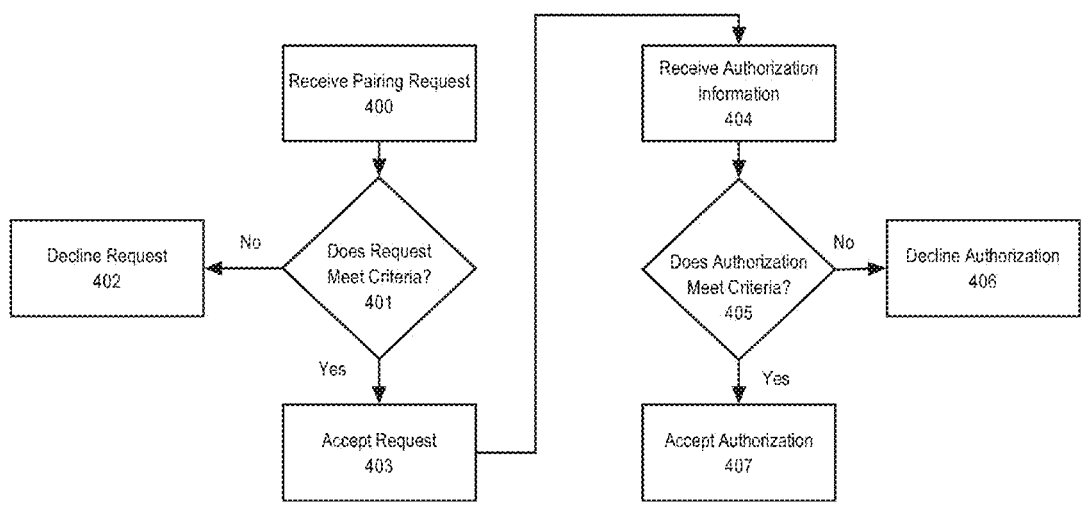
FIG. 4 illustrates a process flow for a target application in block diagram form according to an embodiment.
Figure 5:
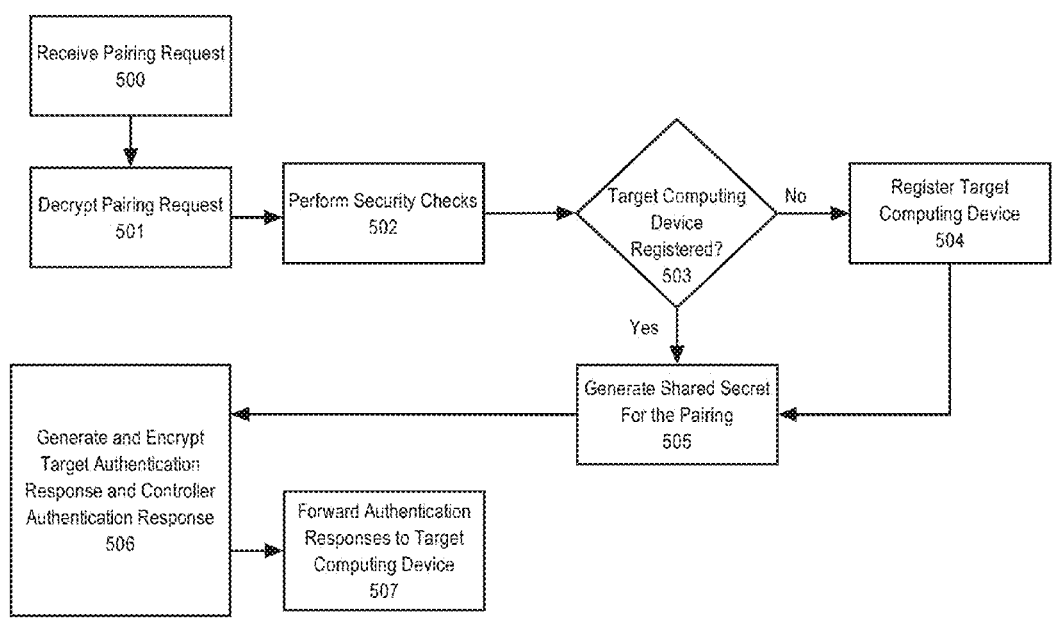
FIG. 5 illustrates a process flow for an authentication server in block diagram form according to an embodiment.

FIG. 2, FIG. 3, FIG. 4, FIG. 5 illustrate aspects of a process flow for creating a secured pairing in block diagram form. In particular, FIG. 2 illustrates a process flow for a controller connector, FIG. 3 illustrates a process flow for a target device connector, FIG. 4 illustrates a process flow for a target application, and FIG. 5 illustrates a process flow for an authentication server. For the sake of illustrating clear examples, it will be assumed that the flow of FIG. 2 is performed by controller connector 100, FIG. 3 is performed by target device connector 102, FIG. 4 is performed by target application 103, and FIG. 5 is performed by authentication server 105. In addition, it will be assumed that user application 106 has been executed on controller computing device 108 and has invoked the controller connector 100 to create a secure connection to target application 103 residing on target computing device 107. In some embodiments, a secure connection indicates that the data being sent over the connection is secured in some fashion (for example, through encryption) such that only the recipient is able to properly interpret (for example, through decryption) the data. Although the steps in FIG. 2, FIG. 3, FIG. 4, and FIG. 5 may be displayed in a particular order, other embodiments may perform the same steps in a different order. In addition, not all the steps described in FIG. 2, FIG. 3, FIG. 4, and FIG. 5 may necessarily be the same in all embodiments. Thus, some embodiments may omit illustrated steps or add additional steps which are not explicitly depicted in FIG. 2, FIG. 3, FIG. 4, and FIG. 5.

For the following explanations, communications may be described as secured with a particular type of encryption, such as symmetric key encryption (for example AES, RC4) or asymmetric key encryption (for example public key encryption, RSA, elliptic curve). However, in other embodiments different encryption techniques, other than the one explicitly mentioned in the example, can be used to achieve the same effect. As a result, one skilled in the art would know that the techniques described herein are not limited to any particular encryption technique to secure communications between the various actors. In addition, although not explicitly stated, any or all of the communications sent between the actors may be checked for integrity and/or authenticated using a message authentication code (MAC), hash-based message authentication code (HMAC), digital signature, or other integrity-checking mechanism.

Referring first to FIG. 2, at block 200, the controller connector 100 registers the controller computing device 108 with the authentication server 105. In an embodiment, the controller connector 100 displays a login screen to the user which asks the user for their login information (user name, password, personal identification number, secret question and answer or other challenge and response). In some embodiments, the controller computing device 108 may not be configured to accept certain types of user input (for example may not include a keyboard or equivalent), thus in those cases the controller connector 100 may automatically supply the log-in information. For example, the controller computing device 108 may be configured with the user's login information when the user application 106 is installed or identifying information may be pre-installed by the manufacturer of the controller computing device 108. The controller connector 100 sends the login information to the authentication server 105 in an encrypted message. For example, the controller connector 100 may use a pre-shared key installed by the manufacturer of the controller computing device 108 or supplied when the user application 106 was installed. Alternatively, the controller connector 100 may use a cryptographic technique, such one based on public key cryptography or the Diffie-Hellman key exchange protocol, to perform the encryption. The aforementioned key used to secure communications between the controller computing device 108 and the authentication server 105 will be referred to as the "controller key".

Upon receiving the login information, the authentication server 105 decrypts the message using the controller key and consults the account database 110 to determine whether the log-in information is correct and/or which services the user's account has permission to access. In response to determining that the user's information matches an account in the account database 110, the authentication server 105 generates credentials for the controller connector 100 and sends the credentials back through the encrypted channel. In an embodiment, the credentials are provided in the form of a ticket, which specifies one or more of the following: an account identifier, a user identifier, a device identifier, a validity period, a list of services to which the user has access, and/or the network address of the controller computing device 108. In an embodiment, the authentication server 105 encrypts the ticket using a key that is known to the authentication server 105 and the service server 109, but not the controller computing device 108 or other intermediary devices to ensure that the ticket cannot be forged or altered. This aforementioned key will be referred to as the "service key". In some embodiments, the controller connector 100 may store credentials for future use, assuming the credentials are still valid at that future point in time, for example, when the expiration period has not ended before the pairing request is made. As a result, in situations where valid credentials are already available, the controller connector 100 may skip block 200 and proceed to block 201.

Alternatively, the user application 106 may register the controller computing device 108 and supply the credentials received from the authentication server 105 to the controller connector 100. For example, the user application 106 may initially require the user to log in for basic service, and also provide an option to enable second screen functions. Thus, when the user logs in, the user application 106 registers the controller computing device 108 with the authentication server 105 and receives the controller credentials. Then, when the user selects the second screen option, the user application 106 invokes the controller connector 100 and supplies the controller credentials so that the controller connector 100 can establish a pairing with the target computing device 107. In such embodiments, the controller connector 100 can skip block 200 and proceed directly to block 201.

At block 201, the controller connector 100 performs discovery to locate compatible devices. In an embodiment, the controller connector 100 performs discovery in two stages. In the first stage the controller connector 100 discovers devices available over network 101. For example, the controller connector 100 may utilize a discovery protocol, such as Universal Plug and Play (UPnP) Simple Service Discovery Protocol (SSDP), to discover available devices. One standard for UPnP is described in "UPnP Device Architecture 1.0" by the UPnP Forum, which is hereby incorporated by reference for all purposes as though fully stated herein. In the second stage, the controller connector 100 queries the discovered devices to determine if one of the discovered devices is executing an application that can be used in conjunction with a second screen (for example target application 103). For example, the controller connector 100 may use Discovery and Launch (DIAL) protocol to find compatible applications. DIAL is described in "Application Discovery", U.S. application Ser. No. 13/827,720, which is hereby incorporated by reference for all purposes as though fully described herein. In an embodiment, once the controller connector 100 discovers one or more compatible devices, the controller connector 100 (or alternatively user application 106) displays a menu listing available devices which can be selected by the user to choose the device for the pairing (for example target computing device 107). Alternatively, if only one compatible device is available over network 101, the controller connector 100 may skip the menu and automatically select that device. In some embodiments, the menu may also include an option to abandon the pairing operation and instead run the service directly on the controller computing device 108. For example, in the case of selecting a video to stream, selecting this option may cause the video to play on the controller computing device 108, rather than a target computing device 107.

In some embodiments, the target computing device 107, when "turned off", may keep one or more components in a low power sleep mode. In an embodiment, when the target computing device 107 receives a discovery request from the controller computing device 108, the target computing device 107 wakes up and executes the target device connector 102 and/or target application 103 contemporaneously with responding to the request. In some embodiments, the target computing device 107 may wait until a later stage to execute the target application 103 and/or target device connector 102 (for example waiting until the user has actually selected the target computing device 107).

At block 202, the controller connector 100 sends a pairing request to the target device connector 102 over network 101. In an embodiment, the pairing request includes the controller credentials received during the registration of block 200, a pin number for the target computing device 107 encrypted under the controller key, and a nonce which will be used to detect and prevent replay attacks. In some embodiments, the pin number for the target computing device 107 changes randomly every set period of time and is displayed on a screen of the target computing device 107. Thus, in such an embodiment, the user may also be asked to input the pin number currently being displayed by the target computing device 107 when selecting a device for the pairing during discovery at block 201. When the pin number is eventually decrypted and checked by the authentication server 105, it serves as evidence that the user had simultaneous access to both the controller computing device 108 and the target computing device 107. In other embodiments, the controller connector 100 may pull the target pin from the target computing device 107 automatically, without the user needing to manually enter the input. Alternatively, an identifier for the target computing device 107, other than a pin number, may also be used for the same purpose. In an embodiment, the nonce represents a randomly selected number, a number based on a serially increasing or decreasing value, a timestamp, value-timestamp pair, or a value generated based on a time-stamp. In some embodiments, the request additionally specifies one or more of: a target device identifier, a timestamp, an action that the pairing will be used for (for example the type of service), a version number of the user application 106, a version number of the controller connector 100, controller identification number, network address of the controller computing device 108, port address of the controller connector 100, and/or other application or device level details. In some embodiments, the parts of the pairing request that are not encrypted under the service key or the controller key are sent in the clear. However, in other embodiments, the controller connector 100 and the target device connector 102 may establish a separate encrypted channel over which to transfer the pairing request.

In FIG. 3, at block 300, the target device connector 102 receives the pairing request sent by the controller connector 100 at block 202 of FIG. 2.

At block 301, the target device connector 102 forwards the pairing request to the target application 103. In some embodiments, the target device connector 102 may forward only the parts of the request that are not encrypted under the service key or the controller key (for example only the information which the target computing device 107 can read).

In FIG. 4, at block 400, the target application 103 receives the pairing request forwarded by the target device connector 102 at block 301 of FIG. 3.

At block 401, the target application 103 determines whether the pairing request meets one or more criteria. For example, the target application 103 may determine whether the pairing request is for a service which is currently enabled for second screen functions, whether the version number of the user application 106 or the controller connector 100 is up to date (or otherwise compatible), whether the timestamp is out of date beyond a particular threshold, whether the pin number for the target device has changed since the time indicated by the timestamp, or any other criteria that the designer of the target application 103 wishes to impose on a pairing request from user application 106. If the pairing request does not meet the criteria imposed by the target application 103, the target application 103 declines the request and informs the target device connector 102 at block 402. If the pairing request meets the criteria imposed by the target application 103, the target application 103 accepts the request and informs the target device connector 102 at block 403. For example, the target application 103 may respond with one value if the pairing request is accepted and a different value if the pairing request is rejected.

Referring back to FIG. 3, at block 302, the target device connector 102 determines whether the target application 103 accepted or rejected the pairing request based on the response. In the event that the target application 103 declines the request, the target device connector 102 sends a message back to the controller connector 100 that informs the controller connector 100 of the failure at block 303. In response, referring back to FIG. 2, the controller connector 100 determines that the pairing was not successful at block 204, and returns an error at block 207 to the user application 106 for eventual display to the user. Thus, one consequence of a pairing request being rejected by the target application 103 is that the pairing request is not forwarded to the authentication server 105, relieving the authentication server 105 of the burden of processing requests that are guaranteed to fail. However if, referring back to FIG. 3, the target application 103 accepts the pairing request, the target device connector 102 proceeds to block 304.

At block 304, the target device connector 102 encrypts the pairing request using a key known to the target computing device 107 and the authentication server 105. This aforementioned key will be referred to as the "target device key". In some embodiments, prior to encrypting the pairing request, the target device connector 102 appends additional information to the pairing request. For example, the target device connector 102 may append the pin number for the target computing device 107 to the pairing request. As another example, the target device connector 102 may have been previously registered by the authentication server 105 during a previous pairing session with the controller computing device 108 or from pairing with a different controller. Assuming the credentials that the target computing device 107 received previously are still valid; the target computing device 107 can include those credentials to prove its identity to the authentication server 105. For example, the credentials may be a ticket in the same form used for the controller credentials described earlier. The credentials for the target computing device 107 will be referred to as the "target device credentials". In an embodiment, the target device key is derived using a pre-shared secret installed by the manufacturer of the target computing device 107. In other embodiments, the target device key may be derived using a cryptographic protocol, such as the Diffie-Hellman key exchange protocol. The exact protocol used to establish a secure channel between the target computing device 107 and the authentication server 105 is not critical, and one skilled in the art would recognize that any number of cryptographic protocols may be used to accomplish substantially the same result. In some embodiments, the target device connector 102 may encrypt only part of the pairing request. For example, the target device connector 102 may encrypt the added information (for example the pin number of the target computing device 107), but may leave all or part of the original pairing request intact along with the target device's credentials (if any already exist). Thus, the portions of the pairing request that are already encrypted under another key or the portions not critical to security may be left in place to save resources when encrypting the pairing request.

At block 305, the target device connector 102 forwards the encrypted pairing request to the authentication server 105 over network 104.

In FIG. 5, at block 500, the authentication server 105 receives the pairing request that the target device connector 102 forwarded at block 305 of FIG. 3.

At block 501, the authentication server 105 decrypts the pairing request. In an embodiment, the authentication server 105 uses the target device key to decrypt the pairing request, then uses the service key and controller key to decrypt the controller credentials and the pin number of the target computing device 107 that had been encrypted by the controller connector 100 respectively.

At block 502, the authentication server 105 performs security checks on the information in the pairing request. In an embodiment, the security checks include performing one or more of the following: checking that the action specified in the pairing request is valid, validating the controller credentials, validating any message authentication codes or digital signatures sent with the pairing request, checking that the pin number supplied by the controller computing device 108 matches the pin number supplied by the target computing device 107, and/or validating the target device credentials (if applicable). If any of the security checks performed by the authentication server 105 fails, the authentication server 105 returns an pairing failure error to the target device connector 102, which then forwards the error to the controller connector 100 for display to the user. Otherwise, the authentication server 105 proceeds to block 503.

At block 503, the authentication server 105 determines whether the target computing device 107 is registered. For example, the authentication server 105 may check the pairing request for the presence of target device credentials. If the authentication server 105 determines that the target computing device 107 is already registered, the authentication server 105 records the pairing and proceeds to block 506. For example, the authentication server 105 may make an entry in the account database 110 specifying the devices involved in the pairing, the credentials of the devices involved in the pairing, and/or the account or user to which the pairing is attributed. Otherwise, if the target computing device 107 is not already registered, the authentication server 105 registers the target computing device 107 at block 505.

At block 504, the authentication server 105 registers the target computing device 107. In an embodiment, the authentication server 105 registers the target computing device 107 by generating target device credentials in the same fashion as the controller credentials discussed earlier. In this case, the user and/or account information for the target device credentials would be derived from the same user and/or account specified in the controller credentials. The target device credentials are then included in the response to the pairing request which will be sent back to the target device connector 102 at block 507.

At block 505, the authentication server 105 generates a shared secret for the pairing. This shared secret will ultimately be used to secure communications between the target computing device 107 and the controller computing device 108 during the pairing session. In an embodiment, the authentication server 105 also records the shared secret in association with the user's account in the account database 110.

At block 506, the authentication server 105 generates and encrypts a target authentication response using the target device key and a controller authentication response using the controller key. In an embodiment, each authentication response includes the shared secret, the nonce sent with the pairing request, and authentication information (for example a value indicating the authentication server 105 has approved the pairing, an identification number for the pairing, a timestamp, account/user permissions). Since each response is encrypted under a key known only to the recipient, both the controller computing device 108 and the target computing device 107 can separately verify that that shared secret (and other encrypted information) originated from the authentication server 105. In the event that the authentication server 105 had to register the target computing device 107, the target authentication response also includes the target device credentials.

At block 507, the authentication server 105 forwards the authentication responses to the target device connector 102 over network 104. In some embodiments, although multiple authentication responses are being sent by the authentication server 105 to the target device connector 102, the responses may be encapsulated within a single message.

Referring again to FIG. 3, at block 306, the target device connector 102 receives the authentication responses sent by the authentication server 105 at block 507 of FIG. 5.

At block 307, the target device connector 102 decrypts the target authentication response using the target device key. Thus, upon decryption, the target device connector 102 possesses the shared secret for the pairing, the nonce, and the authorization information sent by the authentication server 105. Also, depending on whether or not the target computing device 107 was pre-registered, the target device connector 102 may have also received the target device credentials, which can be recorded by the target device connector 102 for future use when requesting services from the service server 109 or when sending future pairing requests to the authentication server 105.

At block 308, the target device connector 102 checks the nonce for a possible replay attack. In an embodiment, the target device connector 102 performs one or more of the following: determines whether a reply with that nonce has been previously received (for example using a log of previously received nonces), determines whether the nonce matches the nonce included in the original pairing request, and/or determines whether the timestamp is within a threshold distance of the current time when the nonce is associated with or based on a timestamp. If any of the aforementioned determinations fails, the target device connector 102 rejects the authentication response and jumps directly to block 303 to fail the pairing. If the determinations succeed, the target device connector 102 records the nonce and proceeds to block 309. In some embodiments, the target device connector 102 may clear recorded nonces after a set period of time. For example, nonces that are older than the threshold distance used when determining if the timestamp is within acceptable bounds the may be discarded to save space and processing time. In an embodiment, the threshold is set based on a historical average of the amount of time it takes for all actors to process the pairing request up to this point in the process and an additional safety margin to account for discrepancies between the clocks of the controller computing device 108 and the target computing device 107. In some embodiments, to reduce the risk of discrepancies between the clocks, the controller computing device 108 and the target computing device 107 may synchronize clocks prior to the controller connector 100 sending the pairing request at block 202 of FIG. 2.

At block 309, the target device connector 102 forwards the authentication information of the target authentication response to the target application 103.

Referring back to FIG. 4, at block 404, the target application 103 receives the authentication information that the target device connector 102 sent at block 309 of FIG. 3.

At block 405, the target application 103 determines whether the authorization information meets one or more criteria. For example, the target application 103 may determine whether the timestamp is within acceptable bounds, whether the account or user specified by the authentication information is permitted to access the service, or any other criteria that the designer of the target application 103 wishes to impose on the target authentication response. In some cases, the target computing device 107 may have been previously registered during a pairing session with a controller bound to a different user's account. As a result, the target application 103 may discover through the authorization information that the pairing is attempting to bind devices which have credentials under two different accounts. Thus, the target application 103 may have a policy which allows such a pairing, or may have a policy that rejects such a pairing. In some embodiments, if the pairing is rejected in this fashion, the target device connector 102 may request a new registration from the authentication server 105 and submit the updated authorization information to the target application 103 for approval.

If the authorization information does not meet the criteria, the target application 103 declines the authorization at block 406. In response, referring back to FIG. 3, the target device connector 102 determines that the authorization has not been accepted at block 310, and informs the controller connector 100 of the failure at block 304. Then, referring back to FIG. 2, the controller connector 100 determines that the pairing was not successful at block 203 and returns an error to the user application 106 at block 207 for eventual display to the user.

If authentication information meets the criteria, the target application 103 accepts the authorization at block 407 and informs the target device connector 102, which causes the target device connector 102 to determine at block 310 that the authorization has been accepted. The target device connector 102 proceeds to block 311, informs the controller connector 100 of the successful pairing, and forwards the controller authentication response. As a result, referring back to FIG. 2, the controller connector 100 determines that the pairing was successful at block 204. At block 205, the controller connector 100 decrypts the controller authentication response to obtain the shared secret, the nonce, and the authentication information. At block 206, the controller connector 100 checks the nonce for possible replay attacks in the same fashion as discussed above for the target device connector 102 at block 308 of FIG. 3. If the nonce fails the checks, the controller connector 100 fails the pairing and jumps directly to block 307. Otherwise, the controller connector 100 establishes a secure communication session with the target device connector 102 using the shared secret at block 207.

4.0 Secure Communication Sessions

In an embodiment, the secure communication session provides functions enabling the user application 106 and the target application 103 to exchange messages and events. The communication session begins with a handshake from the controller connector 100 that informs the target device connector 102 to prepare to process messages from the user application 106 and target application 103. Once the handshake is complete, the user application 106 and target application can utilize a communication mechanism, such as an API, to begin sending and receiving messages over their respective endpoint. The controller connector 100 and the target device connector 102 then function as a transport layer, encrypting outgoing messages based on the shared secret for delivery over network 101 to the other endpoint and decrypting incoming messages based on the shared secret for delivery to their respective application. In an embodiment, the endpoints also take advantage of nonces to prevent replay, as well as message authentication and integrity schemes discussed previously. In some embodiments, the endpoints compare each received message to a particular format to determine that the fields adhere to valid size requirements. For example, if a header of the message indicates that the payload is a particular size, the endpoint may check to ensure that the payload actually is the size as indicated in the header to hedge against potential buffer overflow attacks. In an embodiment, for commands which require access to a service (for example selecting a video to stream from a remote site, accessing an online gaming session), the target device connector 102 sends service requests to the service server 109 that includes the credentials of the target computing device 107. As a result, the service server 109 is able to verify that the target computing device 107 has been authorized by the authentication server 105 before supplying the requested service.

In some embodiments, when the network connection between the controller connector 100 and the target device connector 102 is interrupted, the devices continue to retry sending messages until a specified timeout. However, in other embodiments, the devices may be configured to assume an interruption after particular events indicates an end to the session. For example, in the case of streaming movies, if playback of a movie has ended (or is within a threshold distance from ending) a disruption from the controller (for example the controller shutting off) may indicate that the user has finished their viewing session and the resources to maintain the secure connection may be released. In other embodiments, a network interruption may cause default behaviors in either the controller computing device 108 or the target computing device 107. For example, if network connectivity between the controller computing device 108 and the target computing device 107 is interrupted, the target computing device 107 may pause a video that is currently streaming until receiving an independent instruction from the user (for example via another device or through an interface of the target computing device 107) or until connectivity is reestablished. In some embodiments, a secure communication session ends when one endpoint receives an "end session" message from the other endpoint. For example, the user exiting the user application 106 on the controller computing device 108 may cause the controller connector 100 to send the "end session" message to the target device connector 102 to end the session.

5.0 Example Second Screen Control User Interfaces

Figure 6:
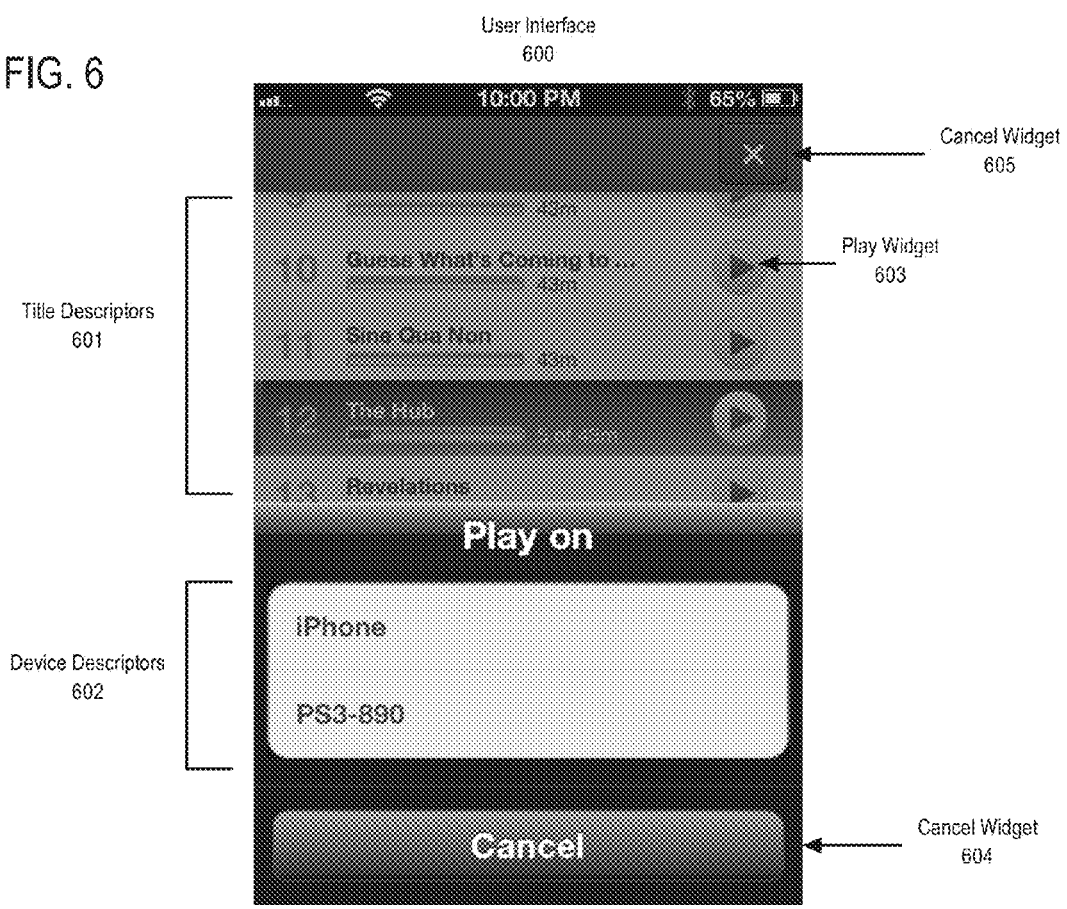
FIG. 6 illustrates a user interface for selecting a target device according to an embodiment.

FIG. 6 illustrates a user interface for selecting a target computing device according to an embodiment. In an embodiment, user interface 600 is presented to the user during the discovery of block 201 of FIG. 2 to allow the user to select a device for the pairing. In FIG. 6, user interface 600 includes title descriptors 601, device descriptors 602, cancel widget 604 and cancel widget 605. For the purpose of illustrating clear examples, it will be assumed that the service provided by the service server 109 relates to streaming videos. However, in other embodiments, the same concepts can be applied to many different contexts, such as playback of previously stored content, online gaming, music streaming In addition, it will also be assumed that the user interface 600 is displayed by the user application 106 of the controller computing device 108.

In an embodiment, the title descriptors 601 display information for titles that can be selected by the user for playback. For example, the title descriptors 601 may display the name of the title, the amount of the title that the user has previously viewed (for example hours/minutes/seconds of the title that the user has already watched) In some embodiments, the title descriptors 601 can be selected to display additional information regarding the title, such as a description of the title's content, user reviews, options to submit a review, actor/director information, country of origin Each of the title descriptors 601 is displayed with a play widget 603, which when selected brings up the device descriptors 602 menu that allows the user to select which device (for example target computing device 107, controller computing device 108) will present the title. The device descriptors 602 may be populated using the techniques discussed above for discovery at block 201 of FIG. 2. In an embodiment, cancel widget 604, when selected, causes the device descriptors 602 menu to close and allow the user to select a different title for viewing. In an embodiment, selecting the cancel widget 605 causes the user interface 600 to return to a previous screen. For example, the previous screen may be a genre selection screen or recommendation list that determines the titles displayed in the title descriptors 601.

Upon selecting a device (for example target computing device 107) from the device descriptors 602 list, the user application 106 invokes the controller connector 100 to create a secure channel to the target application 103. Once the secure channel is established, the user application 106 can send an instruction to the target application 103 to begin playback of the selected title. The user application 106 then sends a request to the service server 109 for the content of the title for presentation on the target computing device 107. In the event that the device selected is the controller computing device 108, the pairing operation is not performed, and instead the target computing device 107 forwards messages between the controller computing device 108 and the service server 109. Alternatively, the controller computing device 108 may utilize a communication channel that does not involve the target computing device 107 acting as an intermediary, provided that the operating environment allows for such an alternative communication channel.

Figure 7:
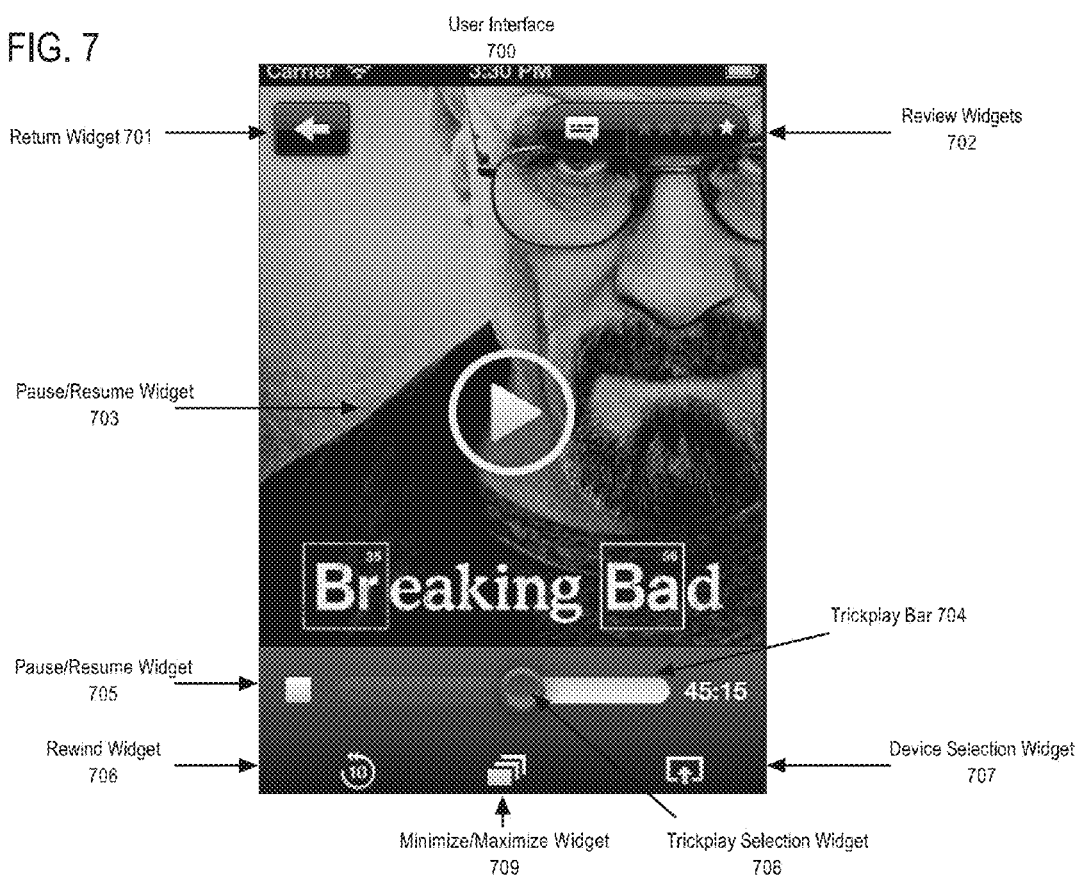
FIG. 7 illustrates a user interface for controlling a target device according to an embodiment.

FIG. 7 illustrates a user interface for controlling a target device according to an embodiment. In FIG. 7, user interface 700 includes a return widget 701, review widgets 702, a pause/resume widget 703, a trick play bar 704, a pause/resume widget 705, a rewind widget 706, a device selection widget 707, and a minimize/maximize widget 709. For the purpose of illustrating clear examples, it will be assumed that the service provided by the service server 109 relates to streaming videos. However, in other embodiments, the same concepts can be applied to many different contexts, such as playback of previously stored content, online gaming, music streaming In addition, it will also be assumed that the user interface 700 is displayed by the user application 106 of the controller computing device 108.

In an embodiment, user interface 700 is displayed by the user application 106 in response to the target computing device 107 beginning to present a title. Continuing from the example described above in reference to FIG. 6, once the target computing device 107 begins to receive and present content from the service server 109, the target application 103 may send a confirmation message to the user application 106 over the secure channel. Then, in response to receiving the confirmation, the user application 106 displays user interface 700 to allow the user to control the presentation of the title on the target computing device 107. In some embodiments, the target application 103 may send update messages to the user application 106 that specify the status of the playback (for example how much time is left for the title, connection metrics such as latency or jitter) to ensure the user application 106 and the target application 103 remain in sync.

In an embodiment, the return widget 701, when selected by a user, causes the user application 106 to return to a previous screen. For example, the user application 106 may return to user interface 600 of FIG. 6 to allow the user to select a new title. In an embodiment, selecting the review widgets 702, brings up a listing of user reviews for the title and/or allows the user to submit their own review of the title. For example, the user may be asked to enter a written review using a keyboard presented in response to selecting the review widgets 702 or the user may enter their review by selecting a number of stars indicating how well the user likes the presented title. In an embodiment, selecting the review widgets 702 sends an instruction to the target application 103 over the secured channel to retrieve other user reviews or to submit the user's own review. In response, the target application 103 performs the requested action by exchanging messages with the service server 109.

In an embodiment, the pause/resume widget 703 causes playback of the title presented on the target computing device 107 to pause or, if playback is already paused, resume playback of the title. In some embodiments, pause/resume widget 703 covers an area of the screen that is set to a backdrop of a scene, character, logo or other image related to the title being presented. For example, in FIG. 7, the pause/resume widget 703 is set against a backdrop of a character from the series "Breaking Bad". In an embodiment, the display of the pause/resume widget 703 changes depending on whether not playback is currently paused to inform the user of the playback's status. In an embodiment, pause/resume widget 705 performs the same functions as pause/resume widget 703 and provides an alternative widget that the user can select to pause and resume playback of the presented title.

In an embodiment, trick play bar 704 displays how far into the title the presentation has currently run. For example, the trick play bar 704 may be displayed as "filling up" as the title is presented, with the percentage of the bar that is filled indicating how far the playback of the title has run. In addition, the trick play bar 704 can be displayed with a value indicating the total length of the title. The trick play bar 704 includes a trick play selection widget 708 that indicates the exact point in time of the playback being presented on the target computing device 107. In an embodiment, the trick play selection widget 708 can be clicked and dragged by the user to select a point in time within the content of the title. In response, the user application 106 sends an instruction to the target application 103 through the secure channel that instructs the target application 103 to restart playback of the title at the specified point in time. Depending on how buffering is performed on the target computing device 107, restarting playback may also require contacting the service server 109 to synchronize the stream to the correct point in time. In addition, the user may select the rewind widget 706 to rewind playback a set amount of time, which follows the same procedures as the user selecting a point in time through the trick play selection widget 708.

In an embodiment, device selection widget 707 can be selected to switch playback of the title between being displayed on the target computing device 107 and the controller computing device 108. For example, if the user selects the device selection widget 707 while the title is being presented on the target computing device 107, the user application 106 sends an instruction to the target application 103 through the secure channel to forward the content stream to the controller computing device 108 for presentation. The user interface 700 then updates to display the content stream in a window. Then, if the user decides to switch back to watching the title through the target computing device 107, the user reselects the device selection widget 707. This causes the user application 106 to send another instruction to the target application 103 to cease forwarding the content stream and instead display the content stream on the target computing device 107.

In an embodiment, selecting the minimize/maximize widget 709 while the user interface 700 is displayed causes all or part of the user interface 700 to minimize. This allows the user to access other applications or functions of the controller computing device 108. Then, if the minimize/maximize widget 709 is selected again, the user interface is then redisplayed in its entirety.

In other embodiments, user interface 700 provides options to adjust the volume of title being presented the target computing device 107 and/or change closed captioning for the presented title.

In some embodiments, the controller computing device 108 may be configured to "sleep" or switch to a low-power battery mode after a period of inactivity. During this sleep mode many devices will "lock" the screen which requires additional input, such as the user running their finger along the screen in a particular pattern or entering a security code, before the user can access most functions of the controller computing device 108. In some embodiments, during a secure communications session, the controller connector 100 may override the default sleep mode of the controller computing device 108 to prevent the device from locking during a secure communications session. For example, while watching a streaming video there may be long periods of time where there is no user interaction with the user application 106 since the user's focus may be directed towards the content being presented. It may be inconvenient for a user to have to unlock the controller computing device 108 to enter a command after each period of inactivity. Thus, by preventing the controller computing device 108 from locking, the controller computing device 108 still saves power by darkening the screen, but may require only minimal user input (for example touching the screen or hitting a button) to wake the device up, rather than needing to go through the security measures needed to unlock the device. In other embodiments, instead of preventing the controller computing device 108 from locking, all or part of user interface 700 may be displayed alongside the security mechanism on the controller computing device 108. Thus, the user can still access the commands through the user application 106 without needing to unlock the controller computing device 108.

In some embodiments, the user application 106, in response to determining that playback of a title has completed (or substantially completed) on the target computing device 107, displays a selection screen of recommended titles for the user on the controller computing device 108. For example, the user application 106 may receive a message indicating end of playback from the target application 103 or the user application 106 may maintain a timer that tracks how much time is left for the title currently being presented. The user may then select a title from the selection screen to cause the target computing device 107 to present the newly selected title. Alternatively, the user application 106 may present an option to add the newly selected title to the user's queue for later viewing.

6.0 Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 8:
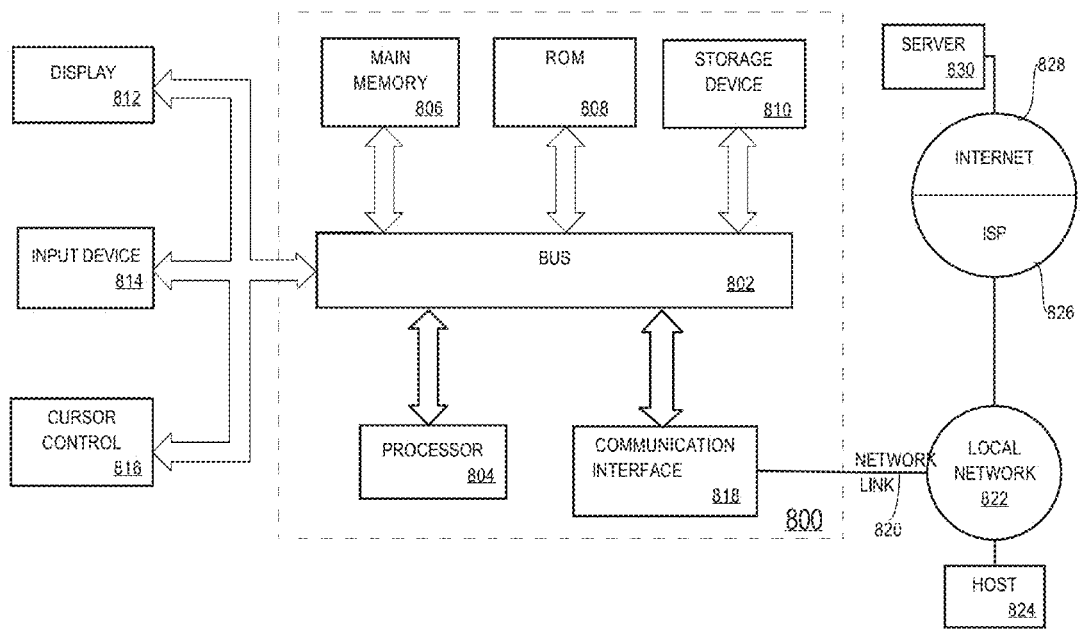
FIG. 8 is a block diagram that illustrates a computer system upon which an embodiment of the invention may be implemented.

For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (for example, x) and a second axis (for example, y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Securely Connecting Control Device to Target Device

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

7.0 Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
    using a target computing device, receiving a pairing request from a controller computing device, the pairing request including controller credentials that were previously received by the controller computing device from an authentication server computer and encrypted under a service key that is not available to the controller computing device and the target computing device;
    using the target computing device, sending at least a portion of the pairing request to a target application executing on the target computing device that is configured determine whether to accept or reject the pairing request based on one or more criteria;
    using the target computing device, in response to receiving a communication from the target application indicating that the target application has accepted the pairing request, forwarding the pairing request to the authentication server computer, the authentication server computer being configured to return a pairing response based at least in part on the controller credentials;
    using the target computing device, receiving the pairing response from the authentication server computer, wherein the pairing response includes a shared secret encrypted under a target device key and the same shared secret encrypted under a controller key, the controller key being unavailable to the target computing device and the target device key being unavailable to the controller computing device;
    using the target computing device, decrypting the shared secret encrypted under the target device key;
    using the target computing device, forwarding the shared secret encrypted under the controller key to the controller computing device;
    using the target computing device, establishing a secure connection to the controller computing device using the decrypted shared secret;
    using the target computing device, receiving, over the secure connection, one or more control messages from the controller computing device that are configured to control one or more functions of the target computing device.

2. The method of claim 1, wherein the target computing device is configured to present multimedia content and the method further comprising:
    using the target computing device, receiving, over the secure connection, an instruction from a second screen user interface application executing on the controller computing device which causes the target computing device to modify presentation of the multimedia content.

3. The method of claim 2, further comprising modifying the presentation of the multimedia content by one or more of: changing volume of the target device, enabling or disabling closed captioning on the multimedia content, beginning playback of the multimedia content, pausing the multimedia content, switching presentation to different multimedia content, changing playback of the multimedia content to resume at a different point in time within the multimedia content, ending playback of the multimedia content, or displaying title recommendations.

4. The method of claim 2, further comprising:
    the controller computing device determining that a period of time has elapsed without receiving input from a user and in response entering a power saving mode and locking the controller computing device to prevent user access to one or more functions of the controller computing device;
    in response to exiting the power saving mode, the controller computing device displaying a user interface that allows the user to unlock the controller computing device, wherein the user interface includes one or more options that, when selected, cause the target computing device to modify presentation of the multimedia content.

5. The method of claim 2, further comprising:
    using the controller computing device, determining that the target computing device has finished playback of the multimedia content and in response displaying one or more titles;
    using the controller computing device, in response to receiving user input specifying selection of a particular title of the one or more titles, sending a message to the target computing device over the secure connection that causes the target computing device to begin presentation of the particular title.

6. The method of claim 1, further comprising:
    using the target computing device, sending at least a portion of the pairing response to a target application executing on the target computing device that is configured determine whether to accept or reject the pairing response based on one or more criteria;
    forwarding the shared secret encrypted under the controller key to the controller computing device in response to receiving a communication from the target application indicating that the target application has accepted the pairing response.

7. The method of claim 1, wherein the controller computing device and the target computing device are communicatively coupled by a local area network.

8. The method of claim 1, wherein the controller computing device is any of a smartphone, a tablet computer, or a wearable computing device.

9. The method of claim 1, wherein the target computing device is one or more of: a television, a projector, a game console, a set-top-box, or a disc player.

10. The method of claim 1, wherein the pairing response includes target device credentials for the target computing device that are encrypted under the service key.

11. A non-transitory computer-readable medium storing one or more instructions, which when executed by one or more processors, cause the one or more processors to perform steps comprising:
    using a target computing device, receiving a pairing request from a controller computing device, the pairing request including controller credentials that were previously received by the controller computing device from an authentication server computer and encrypted under a service key that is not available to the controller computing device and the target computing device;

using the target computing device, sending at least a portion of the pairing request to a target application executing on the target computing device that is configured determine whether to accept or reject the pairing request based on one or more criteria;

using the target computing device, in response to receiving a communication from the target application indicating that the target application has accepted the pairing request, forwarding the pairing request to the authentication server computer, the authentication server computer being configured to return a pairing response based at least in part on the controller credentials;

using the target computing device, receiving the pairing response from the authentication server computer, wherein the pairing response includes a shared secret encrypted under a target device key and the same shared secret encrypted under a controller key, the controller key being unavailable to the target computing device and the target device key being unavailable to the controller computing device;

using the target computing device, decrypting the shared secret encrypted under the target device key;

using the target computing device, forwarding the shared secret encrypted under the controller key to the controller computing device;

using the target computing device, establishing a secure connection to the controller computing device using the decrypted shared secret;

using the target computing device, receiving, over the secure connection, one or more control messages from the controller computing device that are configured to control one or more functions of the target computing device.

12. The non-transitory computer-readable medium of claim 11, wherein the target computing device is configured to present multimedia content and the steps further comprise:

using the target computing device, receiving, over the secure connection, an instruction from a second screen user interface application executing on the controller computing device which causes the target computing device to modify presentation of the multimedia content.

13. The non-transitory computer-readable medium of claim 12, wherein the steps further comprise modifying the presentation of the multimedia content by one or more of: changing volume of the target device, enabling or disabling closed captioning on the multimedia content, beginning playback of the multimedia content, pausing the multimedia content, switching presentation to different multimedia content, changing playback of the multimedia content to resume at a different point in time within the multimedia content, ending playback of the multimedia content, or displaying title recommendations.

14. The non-transitory computer-readable medium of claim 12, wherein the steps further comprise:

the controller computing device determining that a period of time has elapsed without receiving input from a user and in response entering a power saving mode and locking the controller computing device to prevent user access to one or more functions of the controller computing device;

in response to exiting the power saving mode, the controller computing device displaying a user interface that allows the user to unlock the controller computing device, wherein the user interface includes one or more options that, when selected, cause the target computing device to modify presentation of the multimedia content.

15. The non-transitory computer-readable medium of claim 12, wherein the steps further comprise:

using the controller computing device, determining that the target computing device has finished playback of the multimedia content and in response displaying one or more titles;

using the controller computing device, in response to receiving user input specifying selection of a particular title of the one or more titles, sending a message to the target computing device over the secure connection that causes the target computing device to begin presentation of the particular title.

16. The non-transitory computer-readable medium of claim 11, wherein the steps further comprise:

using the target computing device, sending at least a portion of the pairing response to a target application executing on the target computing device that is configured determine whether to accept or reject the pairing response based on one or more criteria;

forwarding the shared secret encrypted under the controller key to the controller computing device in response to receiving a communication from the target application indicating that the target application has accepted the pairing response.

17. The non-transitory computer-readable medium of claim 11, wherein the controller computing device and the target computing device are communicatively coupled by a local area network.

18. The non-transitory computer-readable medium of claim 11, wherein the controller computing device is any of a smartphone, a tablet computer, or a wearable computing device.

19. The non-transitory computer-readable medium of claim 11, wherein the target computing device is one or more of: a television, a projector, a game console, a set-top-box, or a disc player.

20. The non-transitory computer-readable medium of claim 11, wherein the pairing response includes target device credentials for the target computing device that are encrypted under the service key.

21. A data processing system comprising:

one or more processors;

a non-transitory computer-readable storage medium communicatively coupled to the one or more processors and storing one or more instructions which, when executed by the one or more processors, cause the one or more processors to perform:

using a target computing device, receiving a pairing request from a controller computing device, the pairing request including controller credentials that were previously received by the controller computing device from an authentication server computer and encrypted under a service key that is not available to the controller computing device and the target computing device;

using the target computing device, sending at least a portion of the pairing request to a target application executing on the target computing device that is configured determine whether to accept or reject the pairing request based on one or more criteria;

using the target computing device, in response to receiving a communication from the target application indicating that the target application has accepted the pairing request, forwarding the pairing request to the authentication server computer, the authentication server computer being configured to return a pairing response based at least in part on the controller credentials;

using the target computing device, forwarding the pairing request to the authentication server computer, the authentication server computer being configured to return a pairing response based at least in part on the controller credentials;

using the target computing device, receiving the pairing response from the authentication server computer, wherein the pairing response includes a shared secret encrypted under a target device key and the same shared secret encrypted under a controller key, the controller key being unavailable to the target computing device and the target device key being unavailable to the controller computing device;

using the target computing device, decrypting the shared secret encrypted under the target device key;

using the target computing device, forwarding the shared secret encrypted under the controller key to the controller computing device;

using the target computing device, establishing a secure connection to the controller computing device using the decrypted shared secret;

using the target computing device, receiving, over the secure connection, one or more control messages from the controller computing device that are configured to control one or more functions of the target computing device.

* * * * *